United States Patent
Chen et al.

(10) Patent No.: US 7,295,708 B2
(45) Date of Patent: Nov. 13, 2007

(54) SYSTEM AND METHOD FOR DETECTING A LIST IN INK INPUT

(75) Inventors: Tongxian Chen, Beijing (CN); Zhouchen Lin, Beijing (CN); Jian Wang, Beijing (CN); Xianfang Wang, Beijing (CN); Jiang Wu, Beijing (CN); Yu Zou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 10/850,680

(22) Filed: May 20, 2004

(65) Prior Publication Data
US 2005/0063591 A1     Mar. 24, 2005

Related U.S. Application Data

(60) Provisional application No. 60/505,797, filed on Sep. 24, 2003.

(51) Int. Cl.
*G06K 9/00* (2006.01)
(52) U.S. Cl. ...................................... 382/181
(58) Field of Classification Search ................ 382/173, 382/176, 181, 186–187, 224–225; 715/517–518, 715/530–531
See application file for complete search history.

(56) References Cited

U.S. PATENT DOCUMENTS

| | | | |
|---|---|---|---|
| 5,038,382 A | 8/1991 | Lipscomb | |
| 5,517,578 A * | 5/1996 | Altman et al. | 382/181 |
| 5,544,265 A | 8/1996 | Bozinovic | |
| 5,615,283 A | 3/1997 | Donchin | |
| 5,864,635 A | 1/1999 | Zetts et al. | |
| 6,525,749 B1 * | 2/2003 | Moran et al. | 715/863 |
| 7,136,082 B2 | 11/2006 | Saund | |
| 7,139,004 B2 * | 11/2006 | Saund et al. | 345/582 |
| 2004/0090439 A1 | 5/2004 | Dillner | |
| 2005/0063592 A1 | 3/2005 | Li | |
| 2005/0063594 A1 | 3/2005 | Li | |

FOREIGN PATENT DOCUMENTS

EP     1331592 A     7/2003

OTHER PUBLICATIONS

Fonseca, et al. "Experimental evaluation of an on-linescribble recognizer", Pattern recognition letters, pp. 1311-1319, 2001.*

(Continued)

*Primary Examiner*—Daniel Mariam
(74) *Attorney, Agent, or Firm*—Workman Nydegger

(57) ABSTRACT

A system and method for detection of a list in ink input is provided. A detector is provided that may detect a list such as a bulleted or numbered list of items in ink input. A group of lines may first be selected as a candidate list. Indentation level clustering and bullet detection may then be performed to determine the structure of the list. Bullet detection may be performed by detecting bullet partners, which are pairs of lines at the same indentation level that may begin with bullet candidates with similar features. The features of the bullet candidates in a pair of lines may be used to determine the likelihood of whether the pair of lines may be bullet partners. Finally, the structure of the list may be determined, including the relationship among the list items.

39 Claims, 14 Drawing Sheets

OTHER PUBLICATIONS

Apte, et al. "Recognizing multistroke geometric shapes: an experimental evaluation", Washington university, pp. 122-128, 1993.*

Lank, et al. "An interactive system for recognizing hand drawn UML diagrams", ACM, pp. 1-15, 2000.*

Kojima, H., et al. "On-line hand-drawn line-figure recognition and its application" proceeding of the international conference on pattern recognition, pp. 1138-1142, 1988.*

Galindo, D., et al. "Perceptually-based representation of network diagrams", proceeding of the 4th international conference on document analysis and recognition, pp. 352-356, 1997.*

Copy of international search report in corresponding EP application No. 04019840.2218, Jan. 2006.*

Fonseca, et al. "Experimental evaluation of an on-line scribble recognizer" Pattern Recognition Letters, pp. 1311-1319, 2001.

Apte, et al. "Recognizing multistroke geometric shapes: an experimental evaluation", Washington University, pp. 122-128, 1993.

Lank, et al. "An interactive system for recognizing hand drawn UML diagrams", ACM, pp. 1-15, 2000.

Kojima, H, et al. "Online hand-drawn line-figure recognition and its application" Proceedings of the International Conference on Pattern Recognition. pp. 1138-1142, 1988.

Galindo, D., et al.: "Perceptually-based representation of network diagrams": Proceedings of the 4th International Conference on Document Analysis and Recognition, pp. 352-356, 1997.

Office Action mailed Jun. 13, 2007, cited in related application, Serial No. 10/850,948.

Office Action mailed Jun. 15, 2007, cited in related application, Serial No. 10/850,718.

Copy of International Search Report in Corresponding EP Application No. 04019840.2218, Jan. 2006.

Notice of Allowance mailed Aug. 10, 2007, cited in related application Serial No.: 10/850,948.

* cited by examiner

SYSTEM AND METHOD FOR DETECTING A LIST IN INK INPUT

CROSS-REFERENCE TO RELATED APPLICATIONS

The present invention claims priority to U.S. provisional patent application Ser. No. 60/505,797, filed Sep. 24, 2003, and incorporated herein in its entirety.

FIELD OF THE INVENTION

The invention relates generally to computer systems, and more particularly to an improved system and method for detecting a list in ink input.

BACKGROUND OF THE INVENTION

The ability to detect a list is important for users to be able to write and draw directly on their computers using ink input or ink notes. Current hardware and software may be able to capture ink representing handwriting reasonably well but is currently unable to similarly detect and represent the meaning of handwritten structures such as a list of items in ink input. As a result, users may instead use menu-based application programs to create structures for text such as a list. Various structures may be presented by such application programs for a user to select and/or use in formatting input text. For example, a word processing application program may include a menu option for formatting text as a bulleted or numbered list of items.

Research focused on recognition of hand-drawn objects has yielded marginal results to date. For instance, incremental recognition algorithms have been used that may recognize simple geometric shapes such as a circle or a box from a specific number of strokes made in a particular order. However, such incremental algorithms rely on stroke order and/or assume a particular number of strokes in order to recognize a particular hand-drawn object. Such an approach fails to be robust for several reasons. First of all, none of the incremental algorithms solves the grouping problem of deciding which collection of strokes belongs together because those strokes represent a specific structure or shape. Without the ability to group strokes together that belong to a structure or shape, incremental algorithms may not accommodate multi-stroke structures such as lists.

What is needed is a way for detecting and representing the meaning of hand-written structures that may be insensitive to stroke input order and/or the number of strokes required to form a given structure. Any such system and method should be able to detect multi-stroke hand-written structures and be able to decide which collection of strokes belong together that represent a handwritten structure.

SUMMARY OF THE INVENTION

Briefly, the present invention provides a system and method for detecting a list in ink input. To this end, a detector is provided that may detect a list such as a bulleted or numbered list of items in ink input. The detector may include a list candidate detector for selecting a group of lines that may form a list within the ink input, a list indentation detector for detecting the indentation level of a handwritten line within the list, a bullet detector for detecting a bullet in a handwritten line of the list, and a list structure detector for providing the structure of the list.

The present invention may detect and represent the meaning of a hand-written structure, such as a list, by first performing list candidate identification to select a group of lines that may form a list within the ink input. Indentation level clustering may also be performed for each line of the candidate list to group indentation levels of the candidate list. Bullet detection may then be performed to identify a bullet, such as a graphical or alphanumeric bullet, in a handwritten line within the ink input. Finally, the structure of the list may be determined, including the relationship among the list items, and the candidate list may be confirmed to be a valid list that includes at least two bulleted items.

In one embodiment, bullet detection may be performed by detecting bullet partners, which are pairs of lines at the same indentation level that may begin with bullet candidates with similar features. The features of the bullet candidates in a pair of lines may be used to determine the likelihood of whether the pair of lines may be bullet partners. If the likelihood of the features of the bullet candidates exceeds a threshold, the pair of lines may be considered bullet partners and the bullet candidates may be considered valid bullets. Otherwise, a candidate bullet may be considered a valid bullet if the line of the bullet candidate is a member of an indentation level set that has a subset of bullet partners and the ratio of the number of lines in the set of bullet partners to the number of lines in the indentation level set is determined to be higher than a threshold.

Advantageously, the system and method are insensitive to stroke input order and the number of strokes that may form a hand-drawn structure. Other advantages will become apparent from the following detailed description when taken in conjunction with the drawings, in which:

DETAILED DESCRIPTION

Exemplary Operating Environment

Figure 1:
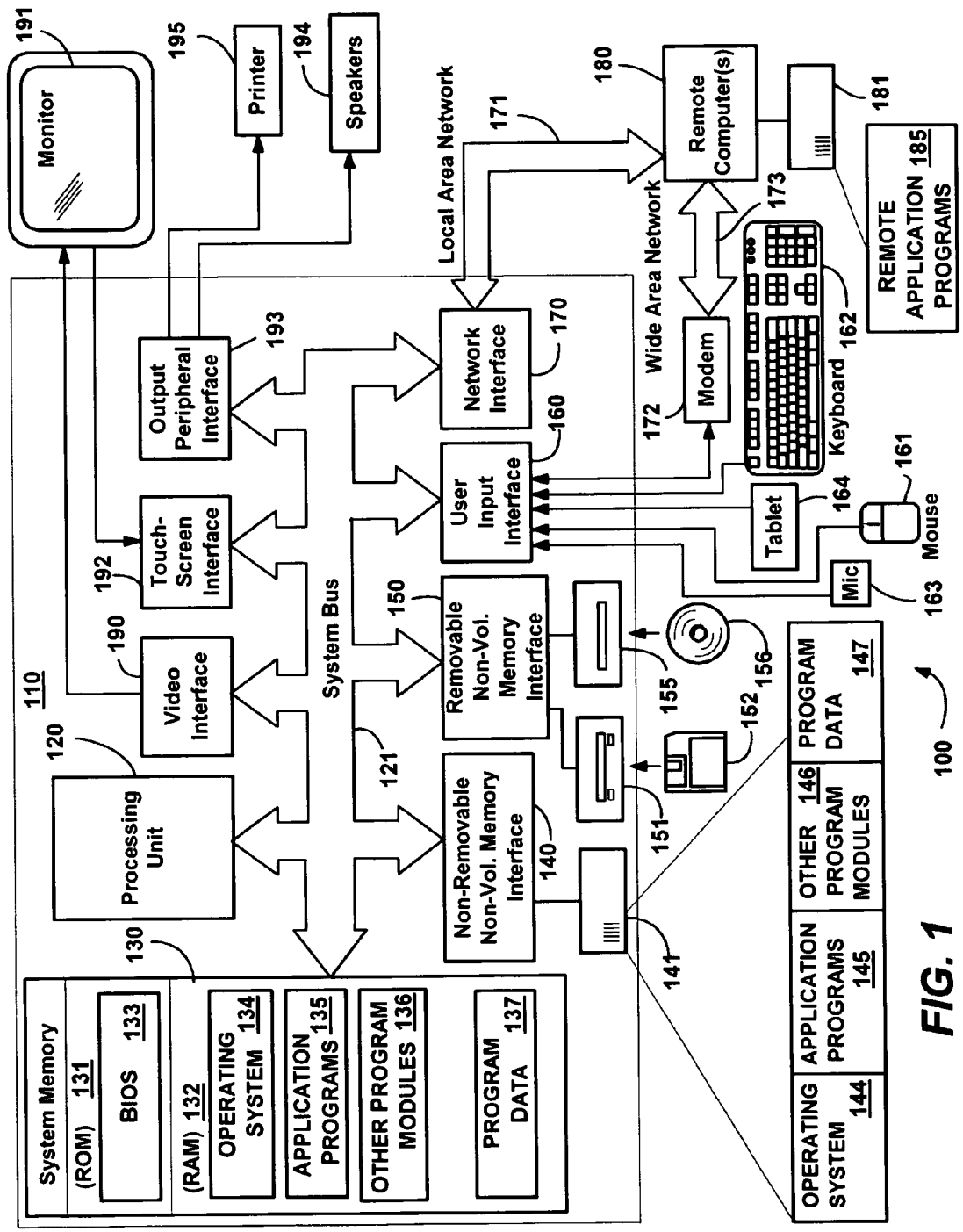
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Detecting a List in Ink Input

The present invention is generally directed towards a system and method for detecting a list in ink input. A user may draw lists freely without restrictions on the handwritten input. A list may have many strokes and the input order of strokes may be arbitrary so that the system and method may accept any ink as input. As used herein, a list means a structure with at least two bulleted list items, where a list item includes at least one line and may include a bullet.

In specific, the system and method may select a group of lines as a candidate list. Indentation level clustering and bullet detection may then be performed in order to determine the structure of the list. Finally, the structure of the list may be determined, including the relationship among the list items. As will be understood, the various block diagrams, flow charts and scenarios described herein are only examples, and there are many other scenarios to which the present invention will apply.

Figure 2:
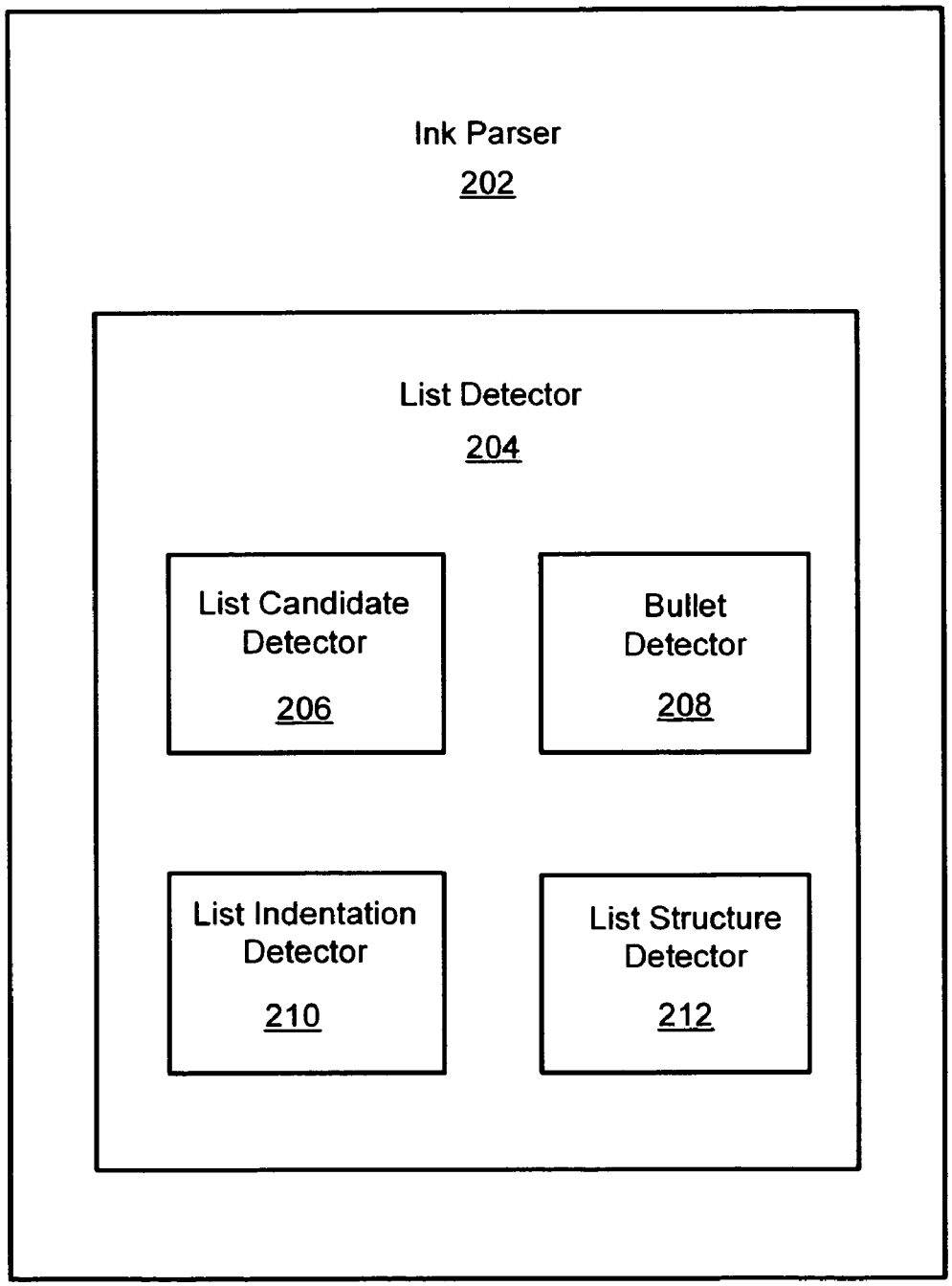
FIG. 2 is a block diagram generally representing an exemplary architecture of system components for detection of a list in ink input, in accordance with an aspect of the present invention.

Turning to FIG. 2 of the drawings, there is shown a block diagram generally representing an exemplary architecture of system components for detection of a list in ink input. Those skilled in the art will appreciate that the functionality implemented within the blocks illustrated in the diagram may be implemented as separate components or the functionality of several or all of the blocks may be implemented within a single component. For example, the functionality for the list candidate detector 206 may be included in the ink parser 202. Or the functionality of the list structure detector 212 may be implemented as a separate component.

The ink parser 202 may accept any ink, including ink with a drawing object. The ink parser 202 may include an operably coupled list detector 204. In general, the ink parser 202 and the list detector 204 may be any type of executable software code such as a kernel component, an application program, a linked library, an object, and so forth. The list detector 204 may include an operably coupled list candidate detector 206 for selecting a group of lines that may form a candidate list from the ink input, an operably coupled bullet detector 208 for detecting a bullet in a line of the list, an operably coupled list indentation detector 210 for detecting the indentation level of a line in the list, and an operably coupled list structure detector 212 for providing the structure of the list, including the relationship among the list items. Each of these components may also be any type of executable software code such as a kernel component, an application program, a linked library, an object, or other type of executable software code.

Figure 3:
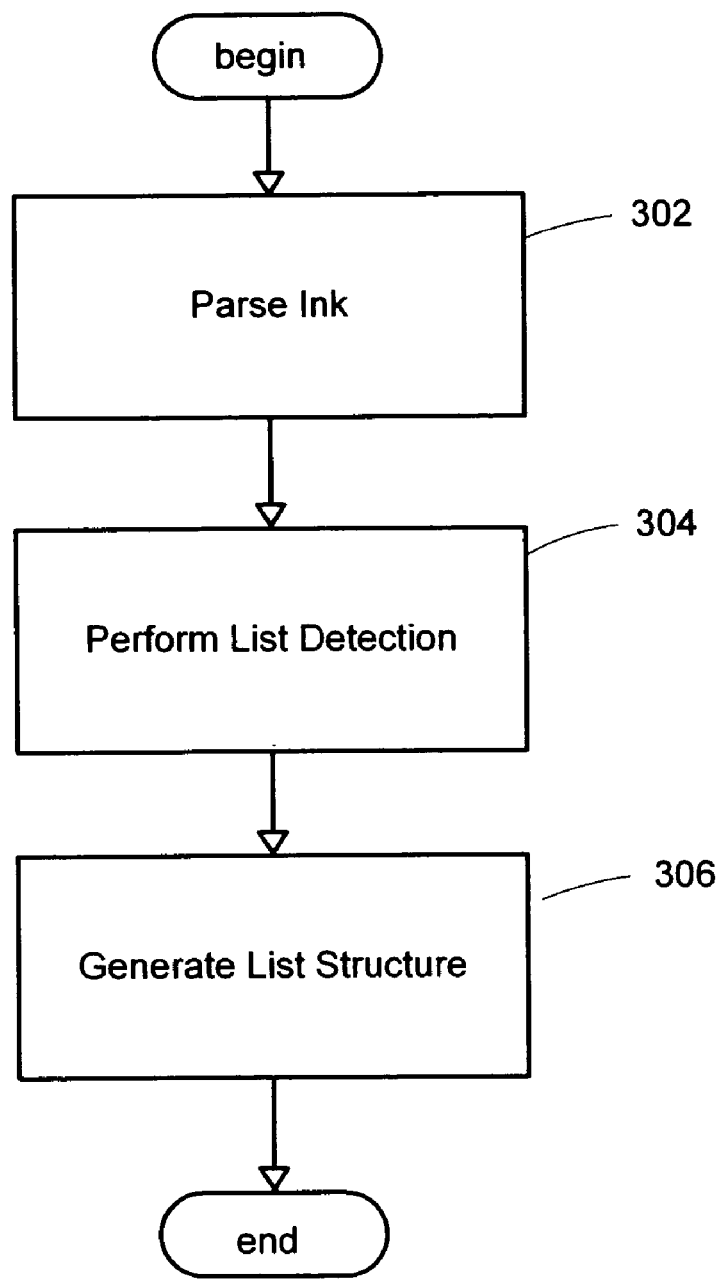
FIG. 3 is a flowchart generally representing the steps undertaken for detection of a list in ink input and generating the list structure, in accordance with an aspect of the present invention.

FIG. 3 presents a flowchart generally representing the steps undertaken for detection of a list in ink input and generating the list structure. At step 302, any ink may be parsed, including ink with a handwritten structure such as a list. For instance, in one embodiment, a page of ink may be accepted as input and parsed. In this embodiment, the ink parser, for example, may have no a priori knowledge of the ink on the page. Therefore, fundamental algorithms such as word grouping, writing/drawing classification and drawing grouping may be executed. In order to perform word grouping, strokes may be grouped into hierarchies of words, lines, and blocks. To do so, the word grouping process may include feature extraction of strokes to capture distance, geometric dissimilarity and linearity, and other stroke features. The word grouping process may also include dynamic programming to group the strokes according to temporal information. The word grouping process may also include clustering to group the strokes according to spatial information. The words, lines and blocks identified in the groups may not necessarily correspond to real semantic words, lines and blocks. In fact, these groups may include strokes of handwritten structures such as a list.

To perform writing/drawing classification, various features may be identified that may differentiate writing from drawing. For instance, single word features such as curvature, density, and other handwriting model features, may be used to differentiate writing from drawing. In one embodiment, context features such as temporal and spatial context features, may be used to differentiate writing from drawing. Each of the various features may be mapped to a fuzzy function, and classification between writing and drawing may be determined according to a combination of the fuzzy functions.

After performing word grouping and writing/drawing classification, the drawing strokes may be well organized by performing drawing grouping. To perform drawing grouping, the drawing strokes may be grouped into independent objects according to the spatial relationship among them. An efficient grid-based approach may be used for fitting the ink strokes into an image grid with an appropriate size. The image grid may be labeled to find connected components. Each connected component may correspond to a drawing object. Heuristic rules may then be applied to adjust the drawing objects.

Using the writing lines and drawing strokes generated by the ink parser, list detection may be performed at step 304 to determine whether a handwritten object is a list, and if so, to provide the structure of the list. List detection may first perform list candidate identification to identify a candidate list. Then indentation level clustering and bullet detection may also be performed in order to determine the structure of the list. Finally, the structure of the list may be determined. At step 306, the list structure may be generated as output. The list structure may be a hierarchical structure such as a directed acyclic graph representing the structural relationship of a list.

Figure 4:
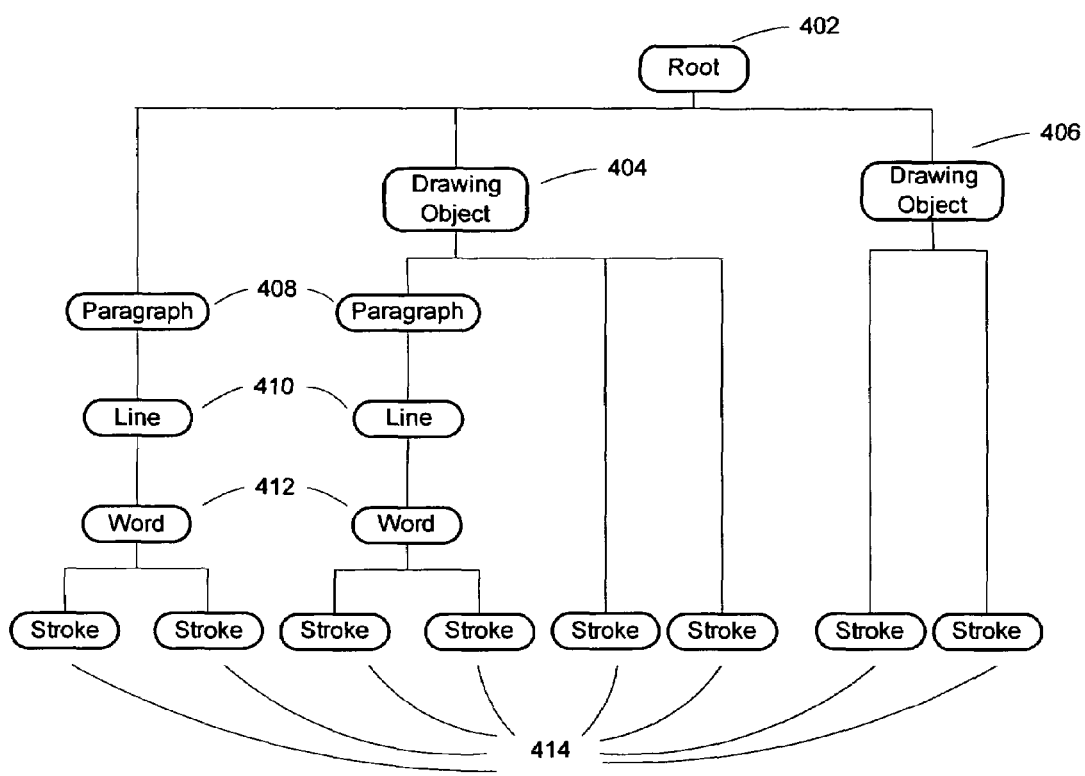
FIG. 4 is an exemplary illustration generally representing a structural relationship of handwritten objects in ink input for use in performing detection of a list, in accordance with an aspect of the present invention.

FIG. 4 presents an exemplary illustration generally representing a structural relationship of handwritten objects in ink input for use in performing detection of a list. Root 402 may represent ink input, such as a page of ink input, that may include writing and one or more drawing objects such as drawing objects 404 and 406. The writing may be structurally represented by paragraph 408 that may be made of line 410 which has a word 412 formed by strokes 414. Drawing object 404 may have associated content such as text which may be structurally represented by paragraph 408 that may be made of line 410 which has a word 412 formed by strokes 414. A handwritten structure such as a list may be detected and its structure determined in ink input 402.

Figure 5:
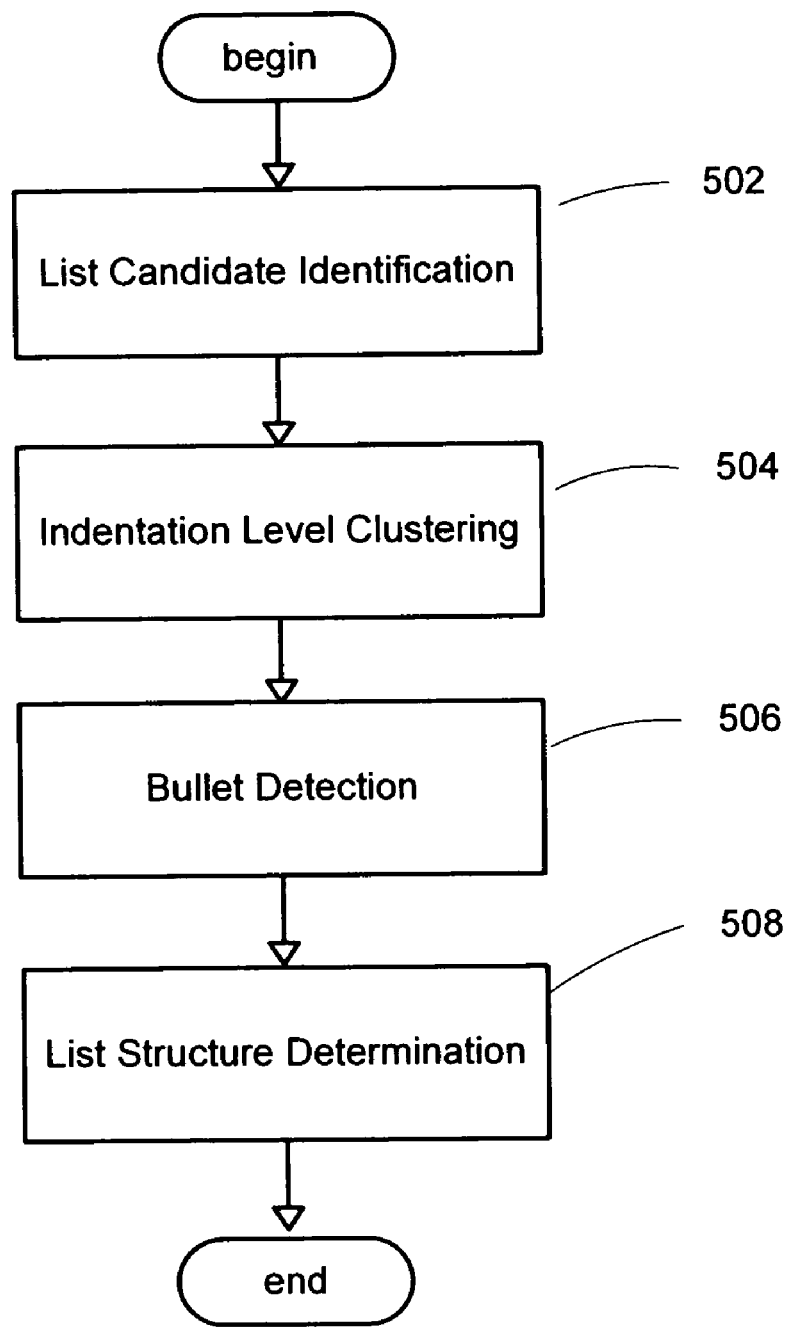
FIG. 5 is a flowchart generally representing one embodiment of the steps undertaken for list detection, in accordance with an aspect of the present invention.

FIG. 5 presents a flowchart generally representing one embodiment of the steps undertaken for detection of a list. At step 502, list candidate identification may be performed to select a group of lines that may form a list within the ink input. Indentation level clustering may also be performed at step 504 for each line of the list candidate to group indentation levels of the list candidate. The indentation of a line is defined herein as the distance from the left edge of the line to the left edge of the list. Indentations may be grouped into levels and indentations at the same level are similar. At step 506, bullet detection may then be performed to identify a bullet. A bullet may be composed of one or several strokes and may begin a line. There are generally two types of bullets, graphical bullets and alphanumeric bullets. Graphical bullets may include a dot, a dash, a circle, a rectangle and so forth. The shape of graphical bullets is usually similar. Alphanumeric bullets may include an alphabetic character, a number, or a combination of alphabetic characters and/or numbers. Typically, a sequence of alphanumeric bullets is incremental. Bullets at the same indentation level are usually the same type. Finally, the structure of the list may be determined at step 508, including the relationship among the list items. The candidate list may then be confirmed to be a valid list if it may include at least two bulleted items.

Figure 6:
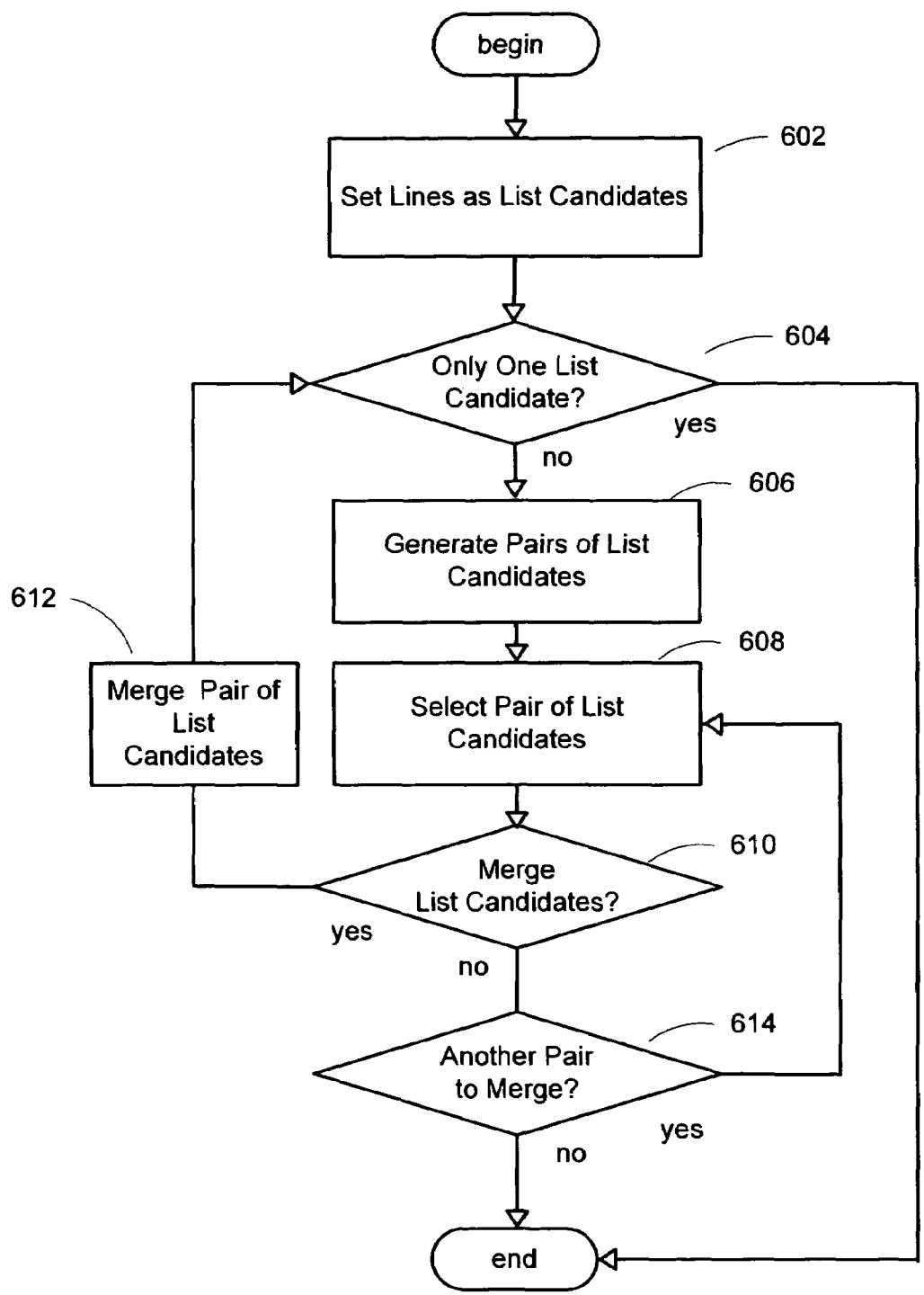
FIG. 6 is a flowchart generally representing an embodiment of the steps undertaken for list candidate identification, in accordance with an aspect of the present invention.

FIG. 6 presents a flowchart generally representing an embodiment of the steps undertaken for list candidate identification. At step 602, each of the writing lines input to the list detector may be set as list candidates. In one embodiment, the list detector may work on only one group of such lines at a time. At step 604, it may be determined whether there is only one list candidate in the group of lines set as list candidates. If so, then list candidate identification may be finished. If not, then pairs of list candidates may be generated at step 606. A pair of list candidates may be selected at step 608 from the pairs of list candidates generated. It may then be determined whether to merge the pair of list candidates at step 610. If the angles of the lines in both lists is almost the same and the vertical distance between the neighboring lines of the lists is small, then the list candidates may be merged into a new list candidate at step 612 and the process may return to step 604. Otherwise, it may be determined at step 614 whether there is another pair of list candidates that may be merged. If so, then the process may return to step 608 to select a pair of list candidates. If not, then the process of list candidate identification may be finished.

Figure 7:
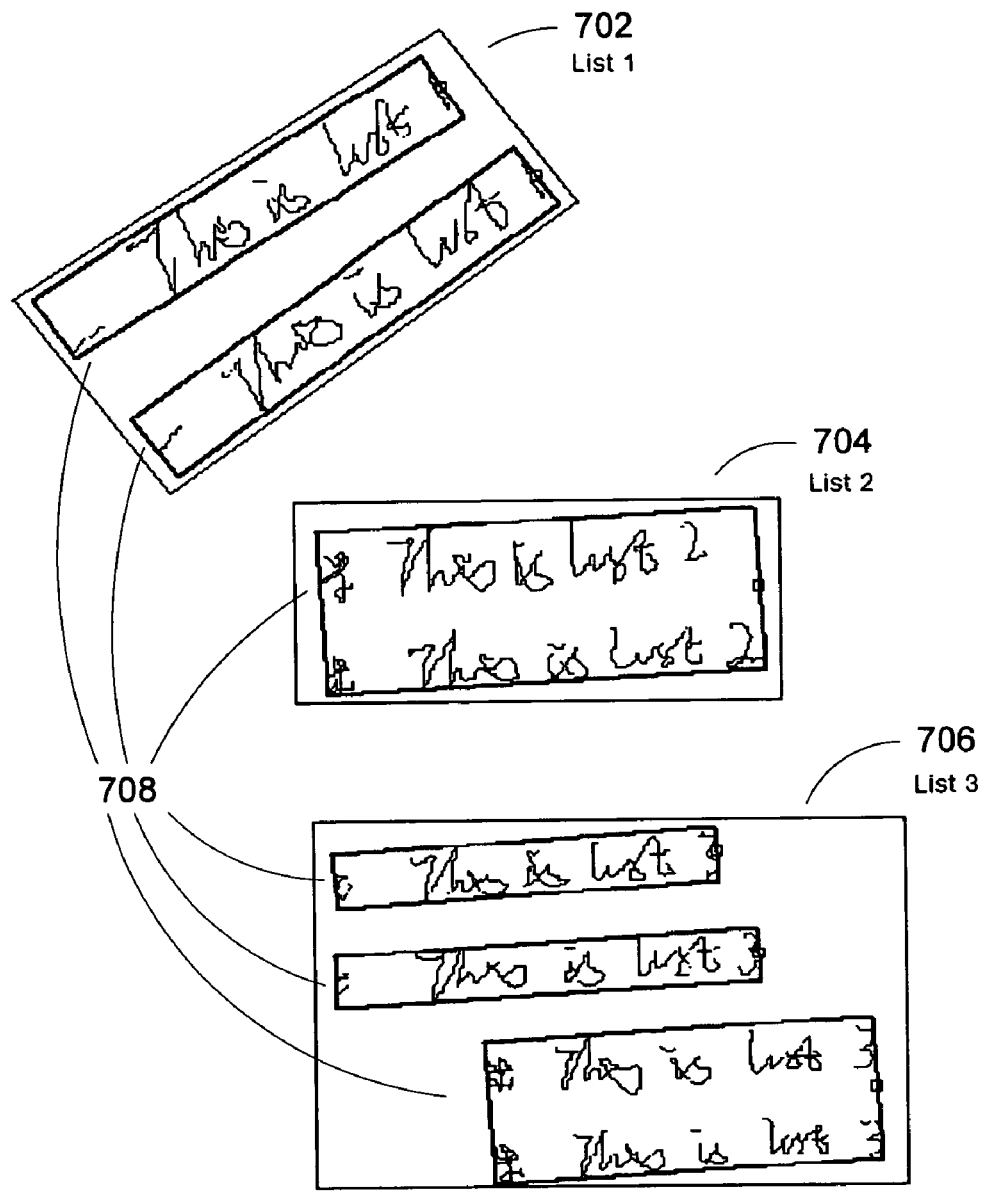
FIG. 7 presents exemplary illustrations generally representing list candidates, in accordance with an aspect of the present invention.

FIG. 7 presents exemplary illustrations generally representing list candidates. There are three list candidates illustrated: list 1 702, list 2 704, and list 3 706. List 1 702 may not be merged with list 2 704 because there is too great a difference of the angles of the lines in both lists. List 2 704 and list 3 706 may not be merged together because the vertical distance between the last line of list 2 704 and the first line of list 3 706 is too great. The rectangles 708 may represent the block grouping made by word grouping performed by the ink parser in one embodiment. A list candidate may include block groupings such as the three block groupings in list 3 706, for example.

Figure 8:
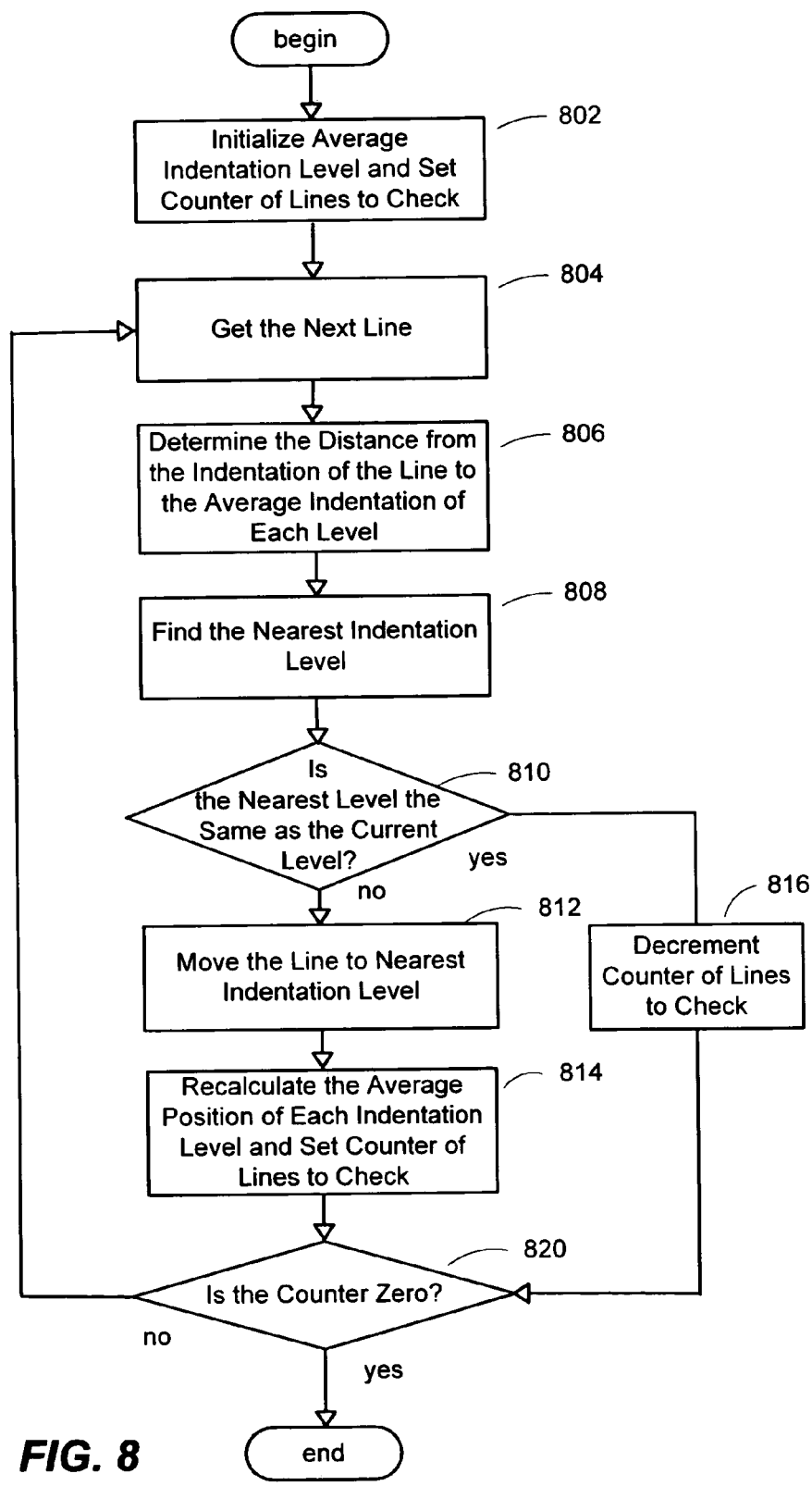
FIG. 8 is a flowchart generally representing an embodiment of the steps undertaken for performing indentation level clustering, in accordance with an aspect of the present invention.

FIG. 8 presents a flowchart generally representing an embodiment of the steps undertaken for performing indentation level clustering. The lines of a candidate list may be clustered into indentation level groups based upon each line's indentation. To do so, the indentation of each line may be computed and then the indentations may be clustered into several indentation level groups. The indentation level of a list item may be equal to the indentation level of its first line.

In one embodiment, the indentation level clustering method used may be the k-mean clustering algorithm well-known in pattern recognition. Given c levels, $m_i$ is the average indentation of level $\Gamma_i$, $$m_i = \frac{1}{N_i} \sum_{y \in \Gamma_i} y,$$

y is the indentation of the line, $N_i$ is the number of lines in level $\Gamma_i$ and $J_e$ is the sum of squared error of all levels. The goal of the clustering is to minimize $J_e$ defined as:

$$J_e = \sum_{i=1}^{c} \sum_{y \in \Gamma_i} \|y - m_i\|^2$$

At step 802, the average indentation level may be initialized as $m_i = i*1$, given an initial stepsize 1 of indentation, and a counter of lines to be checked may be set to the number of lines to check. To support the scenario that a user may write the ink notes in a different size, a normalized indentation may be used in one embodiment. For example, the indentation may be normalized by the average height of the lines in a list candidate, whereby the initial stepsize 1 of indentation may be 1.4* the average height of lines.

At step 804, the next line $y \in \Gamma_i$ may be retrieved. Then the distance from the indentation of y to the average indentation of each level may be determined at step 806. And the nearest indentation level $\Gamma_j$ to $y \in \Gamma_i$ may be found at step 808. At step 810, if the nearest indentation level equals the current indentation level, then the counter of lines to check is decremented at step 816 and indentation clustering is finished for that line. Otherwise, the line may be moved to the nearest indentation level at step 812. The average position of each indentation level may then be recalculated at step 814 and the counter of lines to check may be set to the number of lines to check. At step 820, it may be determined whether the counter of lines is zero. If so, then the process returns to step 804 to get the next line $y \in \Gamma_j$. If not, then the process is finished for indentation at this level.

Figure 9:
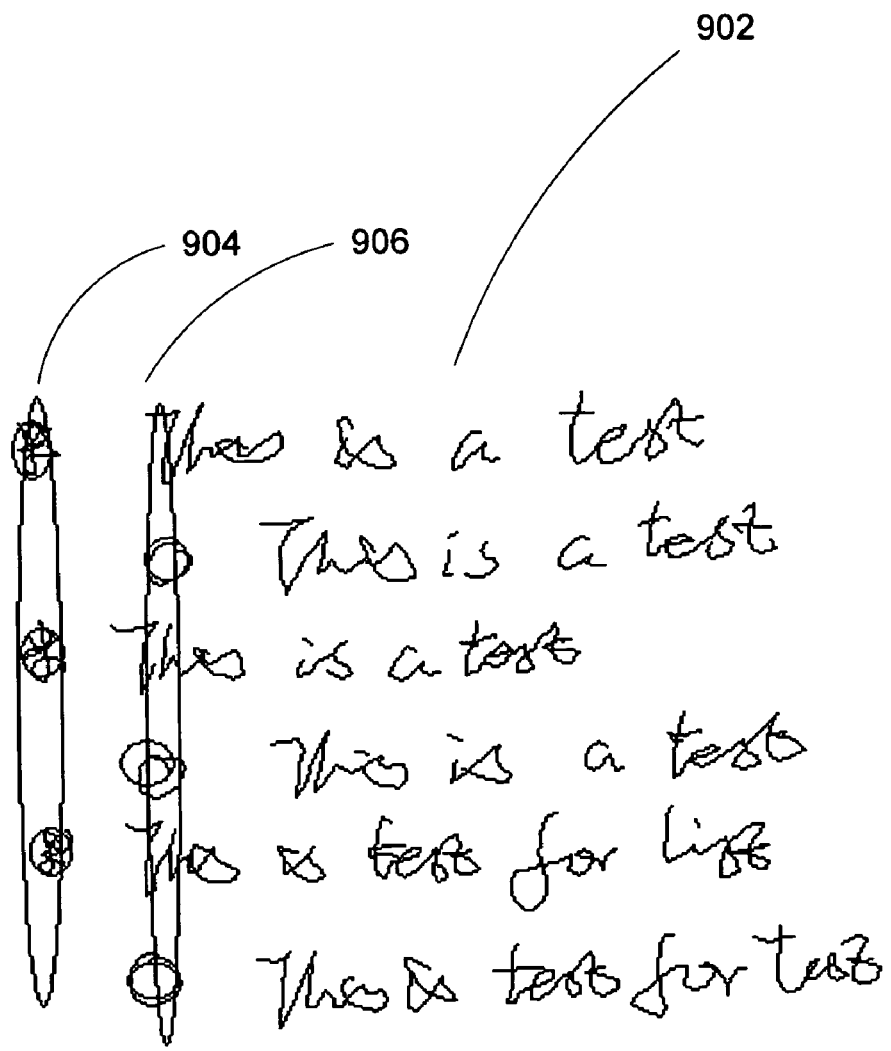
FIG. 9 presents an exemplary illustration generally representing a candidate list after identification level clustering, in accordance with an aspect of the present invention.

FIG. 9 presents an exemplary illustration of a candidate list after identation level clustering. The candidate list 902 has six lines. At the end of indentation level clustering, lines 1, 3 and 5 are in indentation level 1 and lines 2, 4 and 6 are in indentation level 2. Oval 904 encircles the bullets of lines in indentation level 1 and oval 906 encircles the bullets of lines in indentation level 2.

Bullet detection may be performed after indentation level clustering. Bullet detection may determine whether the items of a list include a bullet. The first word of each line in a list may therefore be considered a bullet candidate for the bullet detection process. Based on empirical observations, if two lines in a list have the same indentation level and begin with a bullet, the bullets of these two lines usually are the same symbols, such as graphical bullets or alphanumeric bullets. Consequently, two lines in a list at the same indentation level may likely both begin with a bullet if the bullet candidates of the two lines have similar features. Bullet partners are thus defined herein to be two lines in a list at the same indent level that may begin with bullet candidates with similar features. One of two such lines is the bullet partner of the other. Note that bullet partners may or may not be neighboring lines. In bullet detection, the bullet candidates of bullet partners may be considered bullets.

Figure 10:
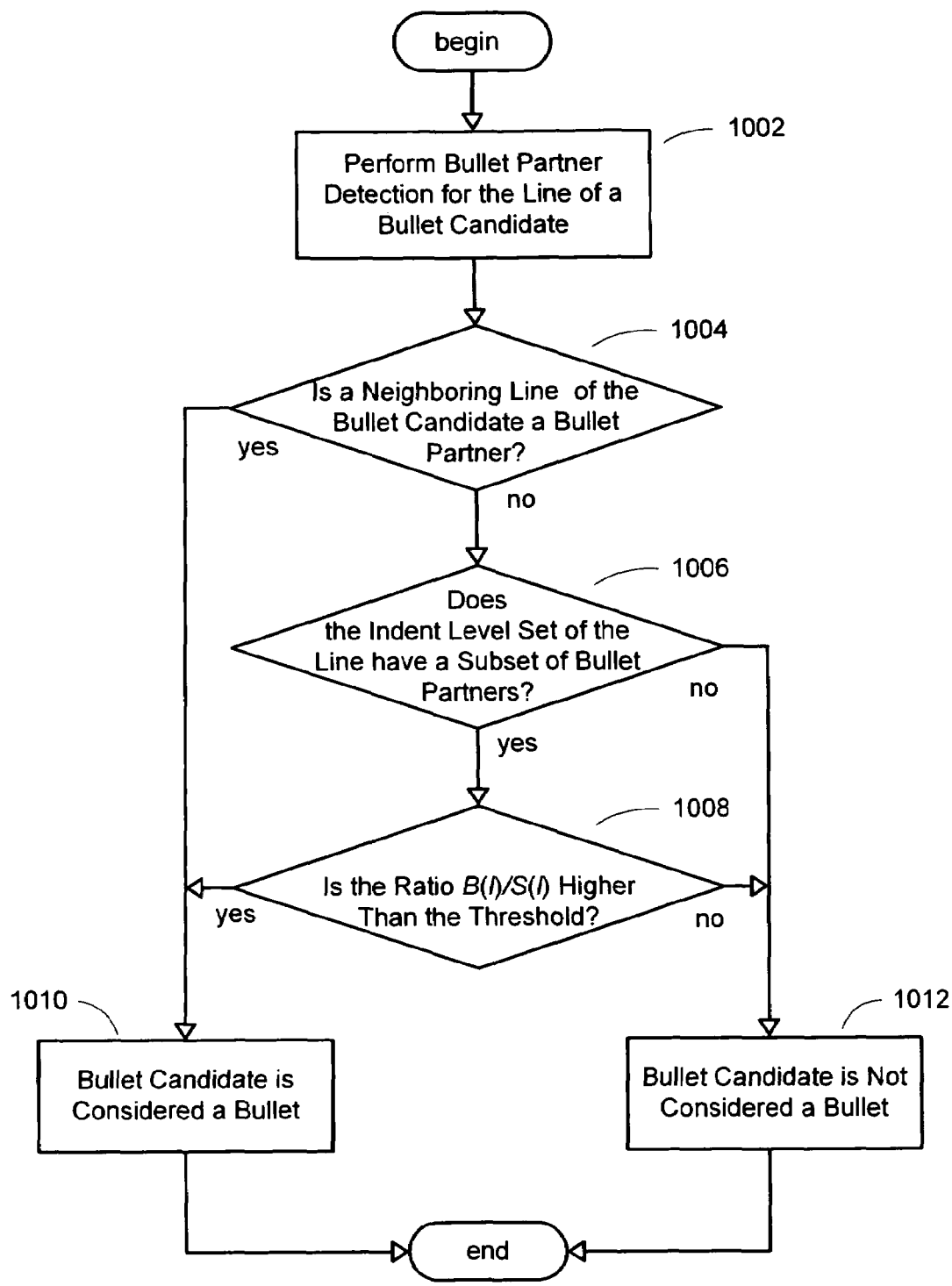
FIG. 10 is a flowchart generally representing an embodiment of the steps undertaken for performing bullet detection, in accordance with an aspect of the present invention.

FIG. 10 presents a flowchart generally representing an embodiment of the steps undertaken for performing for bullet detection. At step 1002, bullet partner detection may be performed for the line of a bullet candidate. At step 1004, the neighboring lines of the bullet candidate at the same indentation level may be checked to determine whether a neighboring line is a bullet partner of the line of the bullet candidate. If so, then the bullet candidate may be considered a bullet at step 1010. If no bullet partner was detected, then it may be determined at step 1006 whether the line of the bullet candidate is a member of an indentation level set that has a subset of bullet partners. If not, then the candidate bullet may not be considered a bullet as indicated at step 1012. If the line of the bullet candidate is a member of an indentation level set that has a subset of bullet partners and the ratio of the number of lines in the set of bullet partners to the number of lines in the indent level set may be determined at step 1008 to be higher than a threshold, then the candidate bullet may be considered a bullet as indicated at step 1010. If not, then the candidate bullet may not be considered a bullet as indicated at step 1012. In one embodiment, the threshold may be empirically set at 0.66. Those skilled in the art will appreciate that other thresholds may be used.

Figure 11:
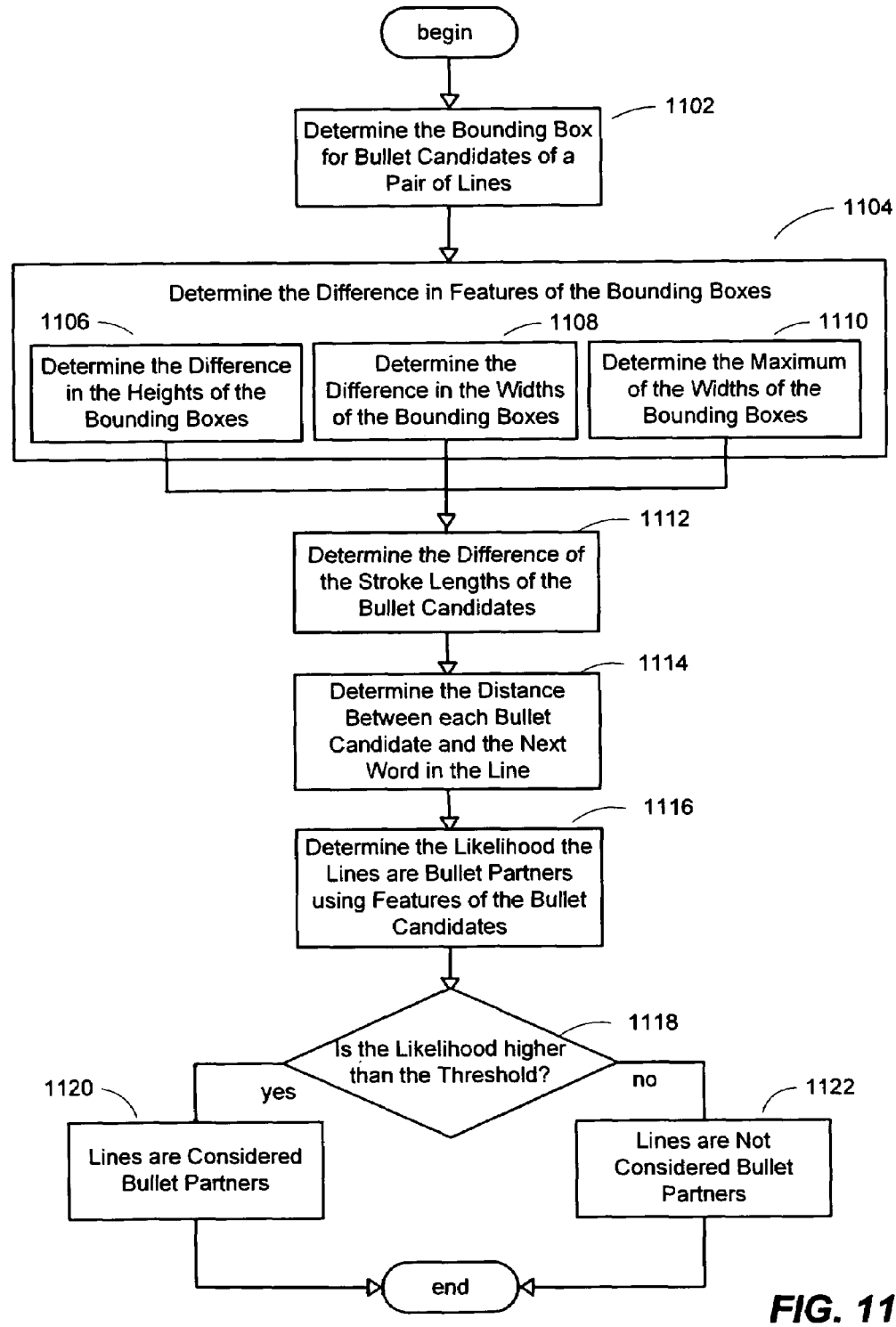
FIGS. 11 is a flowchart generally representing an embodiment of the steps undertaken for performing bullet partner detection, in accordance with an aspect of the present invention.

FIG. 11 presents the steps undertaken to perform bullet partner detection. In one embodiment, bullet partner detection may check whether every pair of lines at a given indentation level may be bullet partners. Advantageously, checking for bullets by line pairs may improve the robustness of the process for bullet detection. For instance, encountering a malformed bullet as a bullet candidate may not result in failing to detect other bullets in the same list.

To improve the parsing speed of the bullet partner detection process, simple features may be used for detecting a bullet from common words that may appear as the first word of a line. These features may include using the width and height of a bounding box around the bullet candidate. For example, the sizes of the bounding boxes of graphics bullets and numbered bullets are usually similar, while the sizes of the bounding boxes of common words that may appear as the first word in a line may vary dramatically. More specifically, the bounding box of bullets often are not as wide or as high as the bounding boxes of common words that may appear as the first word of a line. Those skilled in the art will appreciate that other simple features may be used, such as the distance between the bullet candidate and the next word of the line. Typically, the distance from a bullet to the next word of the line is often larger than the distance between two common words in a line.

In one embodiment, the following five features for detecting a bullet may be used to calculate the probability that the two lines may be bullet partners: $\Delta h = |h(R_a) - h(R_b)|$, $\Delta w = |w(R_a) - w(R_b)|$, $w = \max(w(Ra), w(Rb))$, $\Delta s = \min(s_a, s_b)/\max(s_a, s_b)$, and $d = \min(d_a, d_b)$. For two bullet candidates a and b, the bounding box of a and b, rectangle $R_a$ and the rectangle $R_b$ respectively, may be determined at step 1102 in the angle position of the list where a and b occur.

At step 1104, the difference in features of the bounding boxes may be determined. For example, at step 1106 the difference of the heights of the bounding boxes of the bullet candidates $\Delta h = |h(R_a) - h(R_b)|$ may be determined, where $h(R_a)$ and $h(R_b)$ are the heights of rectangle $R_a$ and rectangle $R_b$ respectively. Or, at step 1108, the difference of the widths of the bounding boxes of the bullet candidates $\Delta w = |w(R_a) - W(R_b)|$ may be determined, where $w(R_a)$ and $w(R_b)$ are the widths of rectangle $R_a$ and rectangle $R_b$ respectively. Or, at step 1110 the maximum of the widths of the bounding boxes of the bullet candidates $w = \max(w(R_a), w(R_b))$ may be determined.

At step 1112, the difference of the stroke lengths of the bullet candidates $\Delta s = \min(s_a, s_b)/\max(s_a, s_b)$ may be determined, where $s_a$ and $s_b$ are the total stroke lengths of the bullet candidates a and b respectively. At step 1114, the distance to the next word of the line $d = \min(d_a, d_b)$ may be determined, where $d_a$ and $d_b$ are the distances between each bullet candidate, a and b, and the next word of their respective lines.

Then the likelihood that the pair of lines are bullet partners may be determined using features of the bullet candidates at step 1116. In one embodiment, a fuzzy function may be constructed which may combine the features to determine the likelihood that the two lines are bullet partners. The function may be defined as:

$$f(\Delta h, \Delta w, w, \Delta s, d) = \frac{1}{1+\left(\left(\frac{\Delta h}{\Delta h_0}\right)^\alpha + \left(\frac{\Delta w}{\Delta w_0}\right)^\beta + \left(\frac{w}{w_0}\right)^\gamma + \left(\frac{\Delta s}{\Delta s_0}\right)^\eta + \left(\frac{d}{d_0}\right)^\kappa\right)},$$

$$(\alpha, \beta, \gamma, \eta, \kappa > 1)$$

where $\Delta h_0$, $\Delta w_0$, $w_0$, $\Delta s_0$, $d_0$ are the thresholds of the five features and $\alpha, \beta, \gamma, \eta, \kappa$ may be used to tune the softness of the decision boundary. The function may decrease monotonously when any feature grows from 0 to infinity. If any feature is above its threshold, the function may be below 0.5. The function value may be 1 when all the features are 0, and may approach 0 when any feature approaches infinity. The decision boundary may be defined as $f(\Delta h,\Delta w,w,\Delta s,d)=0.5$ in one embodiment. In this case, $$\left(\frac{\Delta h}{\Delta h_0}\right)^\alpha + \left(\frac{\Delta w}{\Delta w_0}\right)^\beta + \left(\frac{w}{w_0}\right)^\gamma + \left(\frac{\Delta s}{\Delta s_0}\right)^\eta + \left(\frac{d}{d_0}\right)^\kappa = 1.$$

A determination may be made whether the likelihood of the fuzzy function is higher than the threshold of 0.5 at step 1118. If so, these two lines may be considered bullet partners at step 1120. Otherwise, the two lines may not be considered bullet partners at step 1122.

Figure 12:
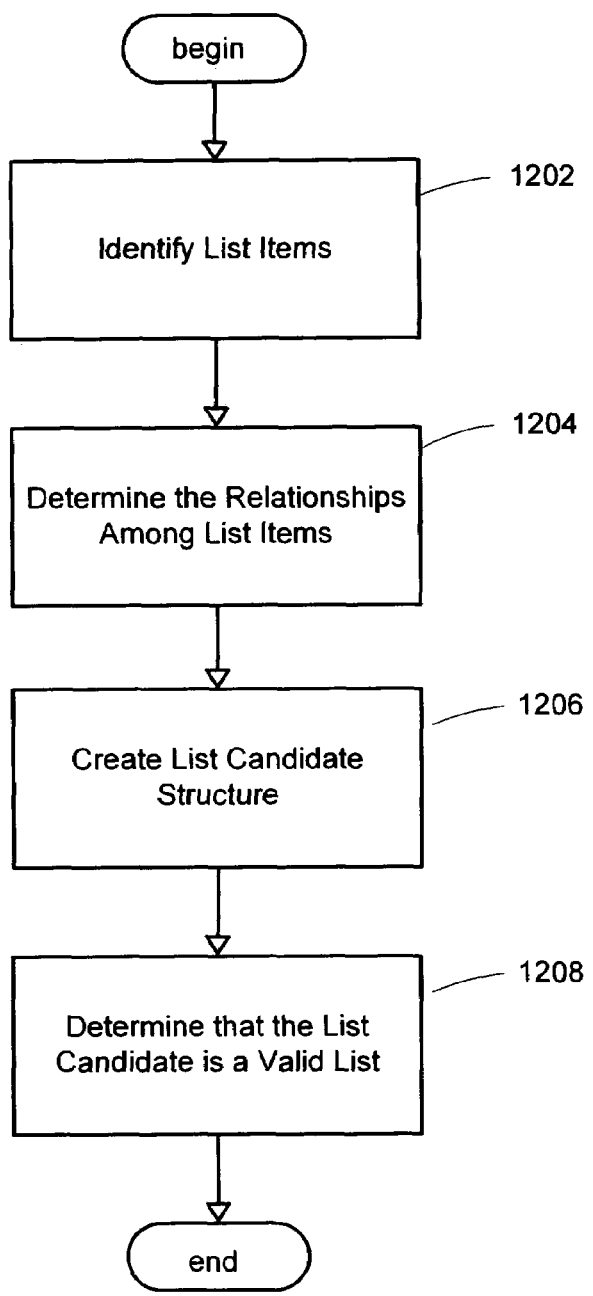
FIG. 12 is a flowchart generally representing an embodiment of the steps undertaken for performing list structure determination, in accordance with an aspect of the present invention.

After bullet detection, list structure determination may be performed using the results of indentation level clustering and bullet detection. For example, the indentation level of each line may be used to determine which lines form list items and may also be used to determine the relationship among identified list items. The structure of a list may also be determined by the presence of bullets. FIG. 12 presents a flowchart generally representing an embodiment of the steps undertaken for performing list structure determination.

At step 1202, list items are identified by determining which lines form a list item. There may be several rules for list item composition. For example, a list item may include only one line beginning with a bullet. If a list item has a line beginning with a bullet, the line should be the first line in the list item. If a list item has a line with a bullet, the indentation level of the line should be equal to or less than the indentation level of any other lines in the list item. If a list item does not have a line with a bullet, the indentation levels of each line in the list item may be the same. Also, the vertical distance between the neighboring lines in a list item may not be very large.

Once list items are identified, the relationship among list items may be determined at step 1204. There may be several rules for determining the relationship between list items. For example, a list item may have any number of sub-items or none at all. The indentation level of a list item may be less than the indentation level of its sub-items. The indentation level may be the same for the sub-items of a list item. A list item may have only one parent item or none at all.

At step 1206, the list candidate structure may be created from the list items. The list candidate structure may be a hierarchical structure such as an acyclic directed graph or tree that may include the list item of a particular indentation level in the list candidate at a specific level of the tree. Finally, at step 1208, it may be determined that the list candidate is a valid list if there are at least two bullets in the list candidate.

Figure 13:
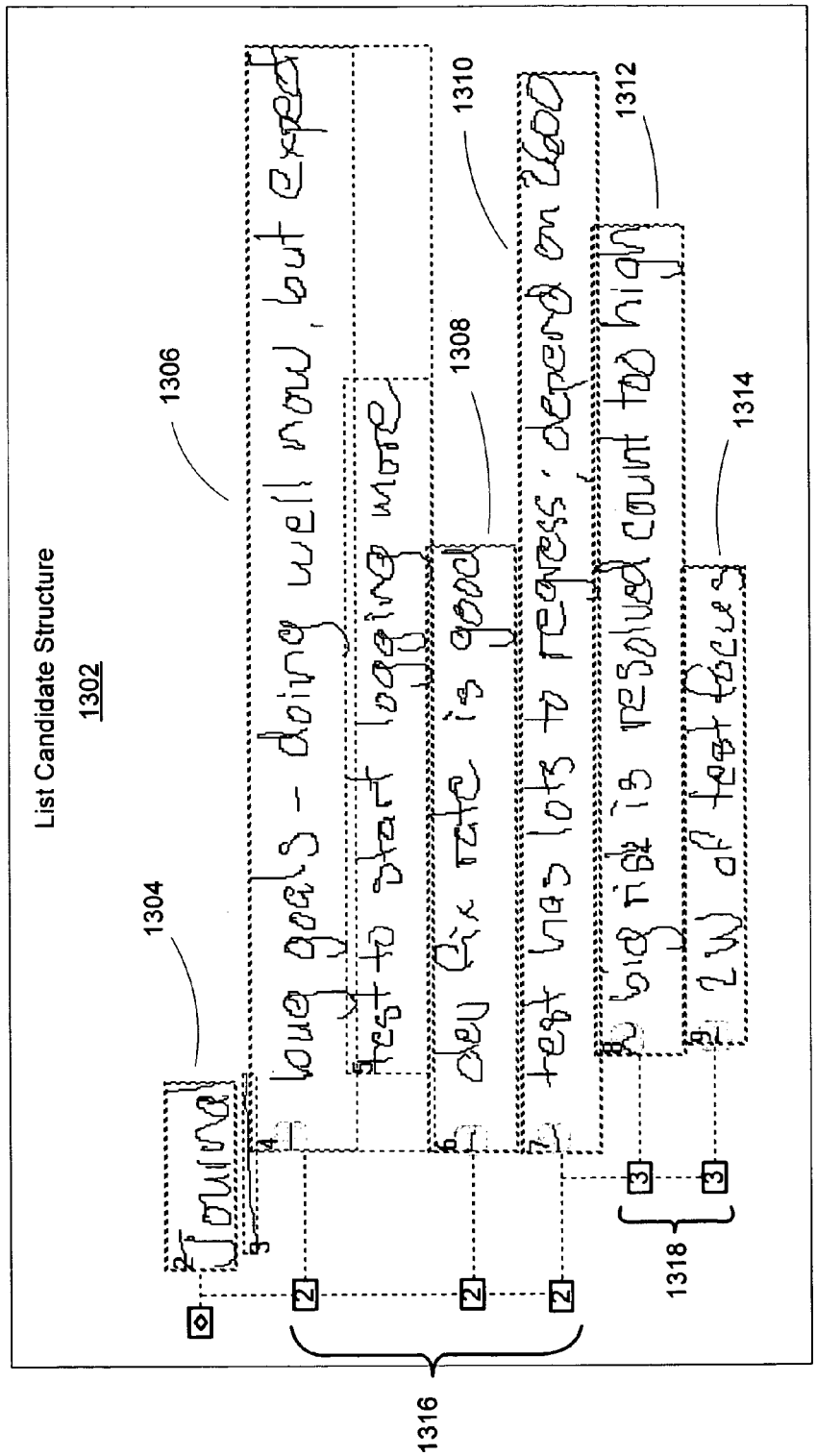
FIG. 13 is an exemplary illustration generally representing one embodiment of a candidate list structure, in accordance with an aspect of the present invention.

FIG. 13 presents an exemplary illustration of one embodiment of a candidate list structure. Candidate list structure 1302 includes several lines numbered at the upper-left corner of the lines and illustrates several examples of list items. For example, line 2 may form list item 1304. Lines 4 and 5 may form list item 1306 because only line 4 begins with a bullet and line 4 is also the first line in the candidate list item. Additionally, the indentation level of line 4 and line 5 are the same, indentation level 2 1316. Lines 6 and 7 are each at the same indentation level, indentation level 2 1316, but each form separate list items 1308 and 1310 respectively, because each of these lines begins with a bullet and a list item may include only one line beginning with a bullet. Lines 8 and 9 are each at the same indentation level, indentation level 3 1318 and each line individually forms separate list items, 1312 and 1314 respectively, because each of these lines begins with a bullet and a list item may include only one line beginning with a bullet.

Figure 14:
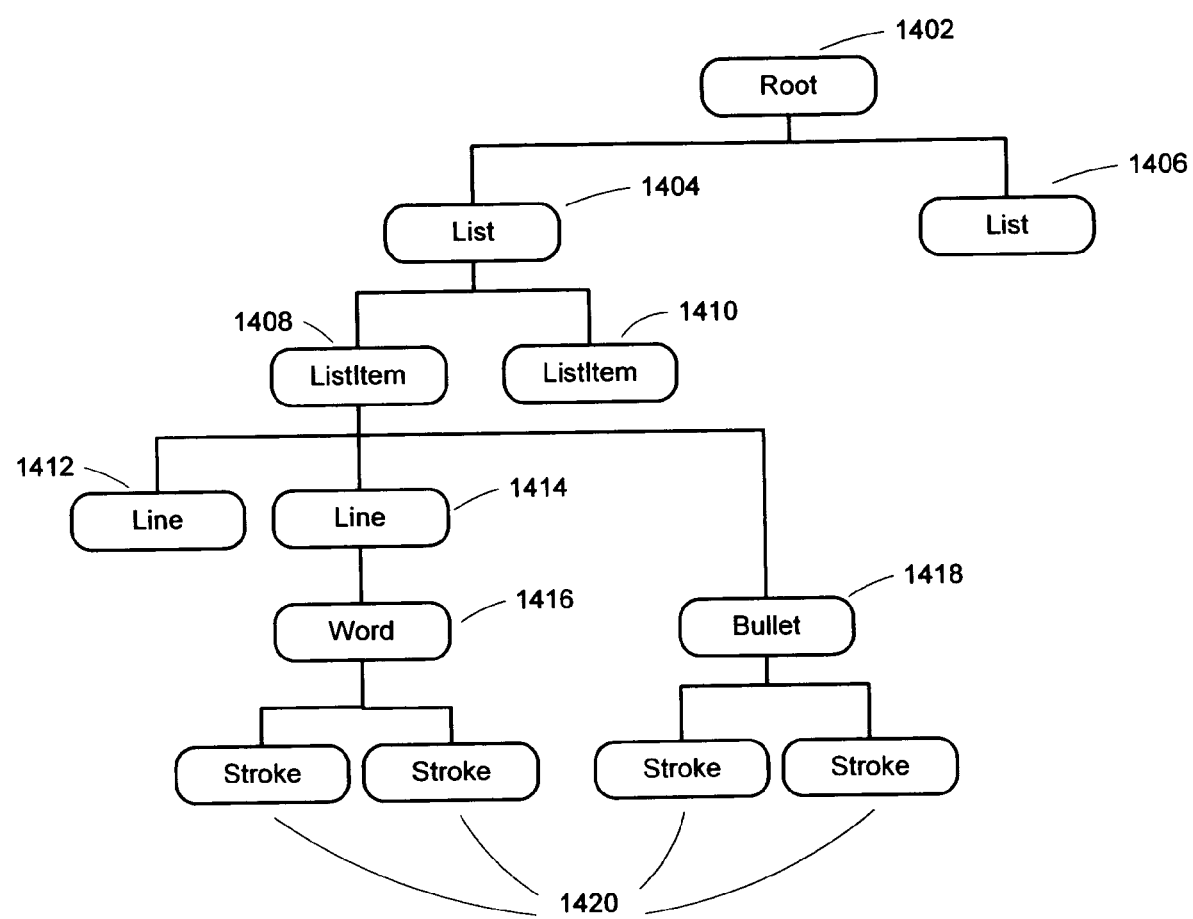
FIG. 14 is an exemplary illustration generally representing a structural relationship of handwritten objects in ink input after performing list detection of a drawing object, in accordance with an aspect of the present invention.

Once the list has been detected and its structure determined, the structural relationship of the handwritten object may now be understood. FIG. 14 is an exemplary illustration generally representing a structural relationship of handwritten objects in ink input after performing list detection of a drawing object. Root 1402 may represent ink input, such as a page of ink input, that may include one or more structures such as list 1404 and list 1406. A list may include one or more list items such as list items 1408 and 1410. A list item may include one or more lines, such as lines 1412 and 1414, and one or more bullets, such as bullet 1418. Each line may include text which may be structurally represented by one or more words such as word 1416 which may be formed by strokes 1420. Each bullet 1418 may be formed by strokes 1420.

After all the lists have been detected by the described system and method, the handwritten objects within the ink input may be completely detected and their structures recognized. By using the present invention, a user may draw lists freely without restrictions on the handwritten input. A list may have many strokes and the input order of strokes may be arbitrary so that the system and method may accept any ink as input. The structure of the list may be recognized, including the relationship among the list items.

As can be seen from the foregoing detailed description, the present invention provides a system and method for detection of lists. Advantageously, the system and method are insensitive to stroke input order and the number of strokes that may form a handwritten list. Furthermore, the system and method provided are flexible and extensible. As is now understood, the present invention may be used to detect any list in ink input, such as a bulleted or numbered list of items, including recognizing the structure of the list. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for detecting a list in ink input, comprising:
receiving ink input;
performing list detection for a list within the ink input by at least performing list candidate identification for selecting a group of lines that may form a list within the ink input and setting a plurality of lines within the group of selected lines as candidates and selecting two list candidates for determining whether the two list candidates may be merged; and
generating a list structure as output.

2. A computer system for detecting a list in ink input, comprising:
a processor; and
system memory having computer-executable instructions and modules for implementing the method recited in claim 1, wherein the modules include:
a list detector for receiving ink input;
an indentation detector operably coupled to the list detector for detecting an indentation of a handwritten line within ink input; and
a bullet detector operably coupled to the list detector for detecting a bullet in a handwritten line within ink input.

3. The system of claim 2 further comprising an ink parser operably coupled to the list detector for sending ink input to the list detector.

4. The system of claim 2 further comprising a list candidate detector operably coupled to the list detector for selecting a group of lines that may form a list within the ink input.

5. The system of claim 2 further comprising a list structure detector operably coupled to the list detector for providing the structure of a list within the ink input.

6. The system of claim 2 wherein the bullet comprises an alphanumeric bullet.

7. The system of claim 2 wherein the bullet comprises a graphical bullet.

8. The method of claim 1 further comprising parsing the ink input to differentiate writing from drawing within the ink input.

9. The method of claim 1 wherein performing list detection comprises performing indentation detection for detecting an indentation of a handwritten line within the ink input.

10. The method of claim 9 wherein performing indentation detection comprises indentation level clustering for grouping indentation levels.

11. The method of claim 9 wherein performing indentation detection comprises performing k-mean clustering for grouping indentation levels.

12. The method of claim 9 wherein performing indentation detection comprises determining a distance from an indentation level of a line to an average indentation level.

13. The method of claim 12 wherein performing indentation detection comprises recalculating an average position of an indentation level.

14. The method of claim 1 wherein performing list detection comprises performing bullet detection to identify a bullet in a handwritten line within the ink input.

15. The method of claim 14 wherein performing bullet detection comprises selecting the first word of the line in the list as a bullet candidate.

16. The method of claim 14 wherein performing bullet detection comprises performing bullet partner detection for the line.

17. The method of claim 16 wherein performing bullet partner detection for the line comprises determining features of the first word in a pair of lines.

18. The method of claim 17 wherein determining features of the first word in the pair of lines comprises determining the differences in the heights and the widths of bounding boxes around the first word in the pair of lines.

19. The method of claim 18 further comprising: determining the maximum of the widths of the bounding boxes; determining the difference of the stroke lengths of the first word in the pair of lines; and determining the distances between each first word and the next word in the pair of lines.

20. The method of claim 17 further comprising determining the likelihood the pair of lines are bullet partners using the features of the first word in the pair of lines.

21. The method of claim 20 further comprising determining whether the likelihood is higher than a threshold, and if so, considering the pair of lines to be bullet partners.

22. The method of claim 14 wherein performing bullet detection comprises determining whether the line has a neighboring line as a bullet partner in a set of lines at the indentation level of the line and, if so, considering the first word of the line to be a bullet.

23. The method of claim 14 wherein performing bullet detection comprises determining whether the line has a bullet partner and, if not, determining whether a set of lines at an indentation level of the line has a subset of bullet partners.

24. The method of claim 23 further comprising determining whether the ratio of the number of lines in the subset of bullet partners to the number of lines in the indentation level set is higher than a threshold, and if so, considering the first word of the line to be a bullet.

25. The method of claim 23 further comprising determining whether the ratio of the number of lines in the subset of bullet partners to the number of lines in the indentation level set is higher than a threshold, and if not, considering the first word of the line not to be a bullet.

26. The method of claim 1 wherein performing list detection comprises determining the structure of the list within the ink input.

27. The method of claim 26 wherein determining the structure of the list within the ink input comprises identifying list items.

28. The method of claim 26 wherein determining the structure of the list within the ink input comprises determining the relationships among list items.

29. The method of claim 26 wherein determining the structure of the list within the ink input comprises creating the structure of the list.

30. The method of claim 26 wherein determining the structure of the list within the ink input comprises determining from the structure of the list that the list is a valid list.

31. The method of claim 30 wherein a valid list comprises a list with at least two bullets.

32. The method of claim 1 wherein performing list candidate identification comprises setting every line within the group of selected lines as a list candidate.

33. The method of claim 1 wherein performing list candidate identification comprises merging two lines from the group of selected lines to form a list candidate.

34. The method of claim 1 wherein performing list candidate identification comprises merging the two list candidates to form a new list candidate.

35. The method of claim 34 wherein performing list candidate identification comprises merging the new list candidate with another list candidate.

36. A computer-readable storage medium having stored computer-executable instructions for performing the method of claim 1.

37. A method for detecting a list in ink input, comprising:
receiving ink input;
performing list detection for a list within the ink input by at least performing indentation detection for detecting an indentation of a handwritten line within the ink input, and wherein performing indentation detection comprises indentation level clustering for grouping indentation levels; and
generating a list structure as output.

38. A method for detecting a list in ink input, comprising:
receiving ink input;
performing list detection for a list within the ink input by at least performing bullet detection to identify a bullet in a handwritten line within the ink input and wherein performing bullet detection comprises determining whether the line has a bullet partner and, if not, determining whether a set of lines at an indentation level of the line has a subset of bullet partners; and
generating a list structure as output.

39. A method for detecting a list in ink input, comprising:
receiving ink input;
performing list detection for a list within the ink input by at least performing bullet detection to identify a bullet in each of a pair of handwritten lines within the ink input by determining features of the first word in the pair of lines and by determining the likelihood the pair of lines are bullet partners using the features of the first word in the pair of lines; and
generating a list structure as output.

* * * * *